US012645344B2

(12) United States Patent
Huang

(10) Patent No.: US 12,645,344 B2
(45) Date of Patent: Jun. 2, 2026

(54) DYNAMIC CUSTOMIZED SINGLE LEVEL MENU

(71) Applicant: Bank of America Corporation, Charlotte, NC (US)

(72) Inventor: Tao Huang, Bellevue, WA (US)

(73) Assignee: Bank of America Corporation, Charlotte, NC (US)

( * ) Notice: Subject to any disclaimer, the term of this patent is extended or adjusted under 35 U.S.C. 154(b) by 253 days.

(21) Appl. No.: 18/436,264

(22) Filed: Feb. 8, 2024

(65) Prior Publication Data

US 2025/0258579 A1     Aug. 14, 2025

(51) Int. Cl.
*G06F 3/0482* (2013.01)

(52) U.S. Cl.
CPC .................................. *G06F 3/0482* (2013.01)

(58) Field of Classification Search
CPC ........ G06F 3/0482; G06N 3/045; G06N 3/08; G06N 3/084; G06N 7/01; G06N 20/00
See application file for complete search history.

(56) References Cited

U.S. PATENT DOCUMENTS

| 7,822,684 | B2 * | 10/2010 | Rielly | ..................... G07F 19/20 |
| | | | | 235/379 |
| 11,163,542 | B2 * | 11/2021 | Sullivan | .................. G06F 9/451 |
| 2012/0317515 | A1 * | 12/2012 | Wang | .................... G06F 3/0488 |
| | | | | 715/764 |
| 2013/0019182 | A1 * | 1/2013 | Gil | ........................ G06F 3/0482 |
| | | | | 715/834 |
| 2025/0139085 | A1 * | 5/2025 | Mohammed | ......... G06N 3/0455 |
| 2025/0231775 | A1 * | 7/2025 | Tao | .......................... G06N 3/08 |

* cited by examiner

*Primary Examiner* — Cao H Nguyen
(74) *Attorney, Agent, or Firm* — Weiss & Arons LLP

(57) ABSTRACT

A system and method may generate a customized single level menu for a user to use with computer-implemented application using a generative AI engine. The single level menu may be user specific and may include menu items selected by the generative AI engine from a multi-level menu that may be provided with the application. The single level menu may be based on user-specific data that may be provided to the generative AI engine, such as information related to a task or topic on which the user is detected to be working or has been working and may be based on one or more of other user information such as past usage of menu items by the user or a user profile. The single level menu may be dynamically updated by the generative AI engine, such as based on a change that may be detected in the usage of the application.

19 Claims, 7 Drawing Sheets

12:48 PM

How can we help?

Trades

Arrange a trade — 710

Your trade history — 712

Research company information — 714

702

12:48 PM

How can we help?

Investments

Accounts — 610

Trades — 612

Statements — 614

602

12:48 PM

How can we help?

Foreign Currency Exchange

Check current exchange rates — 510

Request currency exchange — 512

In person locations — 514

History of user exchanges — 516

502

12:48 PM

How can we help?

Savings Account
Account ending in 5678

Savings Accounts

Credit Cards

Check current exchange rate

Arrange a trade

902

910

912

914

916

918

12:48 PM

How can we help?

Savings Account
Account ending in 5678

Transfer

Request currency exchange

Research company information

Arrange a trade

802

810

812

814

816

818

1000

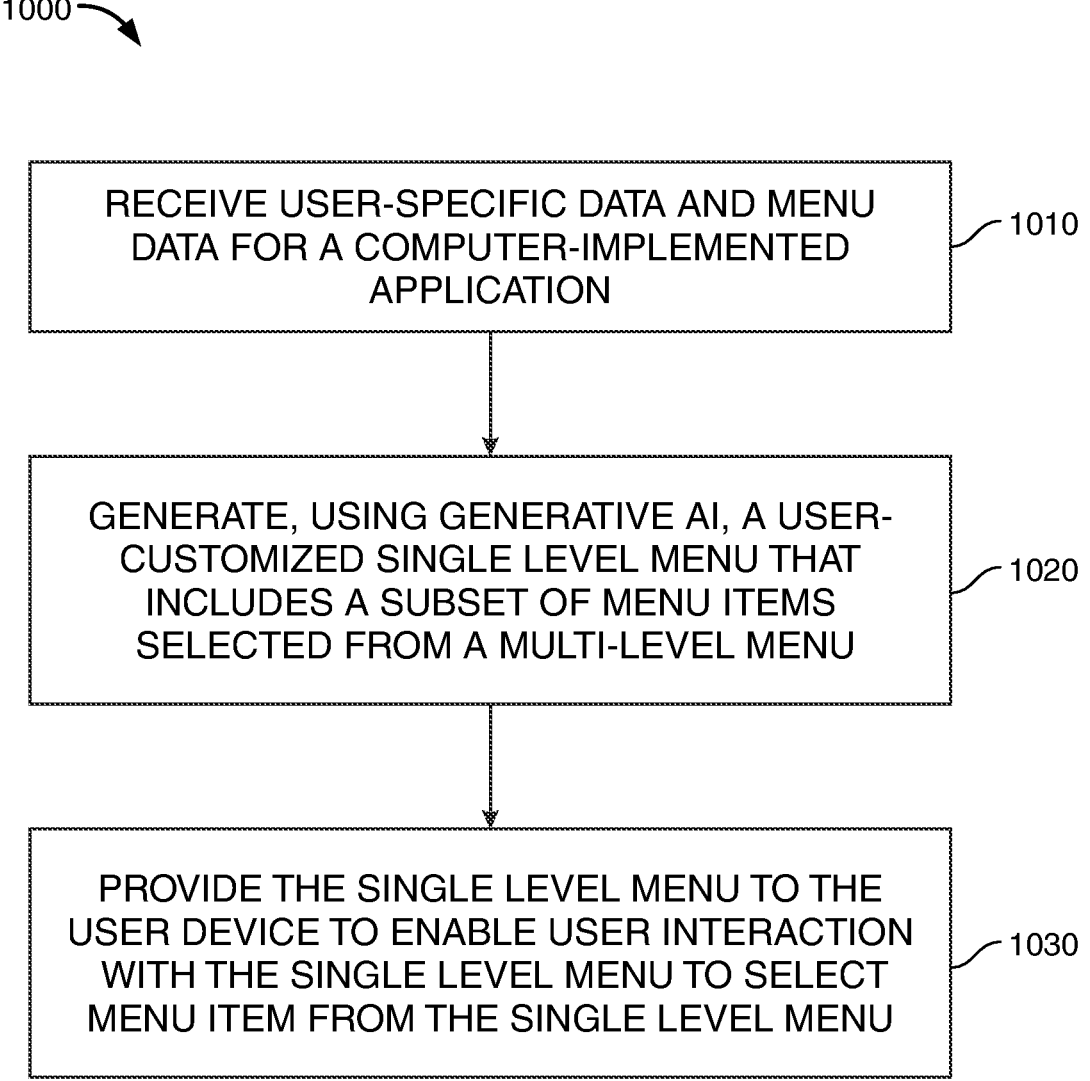

RECEIVE USER-SPECIFIC DATA AND MENU
DATA FOR A COMPUTER-IMPLEMENTED
APPLICATION                                              1010

GENERATE, USING GENERATIVE AI, A USER-
CUSTOMIZED SINGLE LEVEL MENU THAT
INCLUDES A SUBSET OF MENU ITEMS
SELECTED FROM A MULTI-LEVEL MENU          1020

PROVIDE THE SINGLE LEVEL MENU TO THE
USER DEVICE TO ENABLE USER INTERACTION
WITH THE SINGLE LEVEL MENU TO SELECT
MENU ITEM FROM THE SINGLE LEVEL MENU     1030

FIG. 10

DYNAMIC CUSTOMIZED SINGLE LEVEL MENU

FIELD OF THE DISCLOSURE

Aspects of the disclosure relate to using generative artificial intelligence (AI) to generate a dynamic customized single level menu from a multi-level menu of a computer-implemented application.

BACKGROUND OF THE DISCLOSURE

An application on an electronic user device with which a user may interact, such as a software application that may be accessed on a computer or mobile device, may provide many user-selectable menu items as options or features that are available for user selection in a user interface (UI). The menu items may be organized into multiple levels of menus. The multiple levels may include, for example, a main menu, which may be a top level at which a user begins to select the desired menu option, and one or more levels of sub-menus beneath the main menu that the user may need to access to reach the desired menu option. The menus and submenus may be simultaneously displayed on the screen, such as when a main menu is displayed and the user requests viewing of one or more of the submenus. Or a user may view one menu or submenu at a time by drilling down from the main menu through additional levels of menus.

It may be time consuming to locate a desired menu from a multi-level menu. The application may provide a search option to search for a desired menu item from within the multiple levels of menus, but that option may also not be especially convenient. Where multiple levels of a menu are simultaneously displayed, the screen may become cluttered with options or some of the menu items may not be viewed at the same time on the screen.

It is desirable to enable a user to more easily interact with the application using the electronic user device to select a menu item on the application without scrolling through different levels of menus to find the menu items needed by the user while using the application.

SUMMARY OF THE DISCLOSURE

It is an object of this invention to provide a system and method in which a generative AI engine may be used to dynamically generate a single level menu from a multi-level menu. The single level menu may be customized to include a subset of menu items selected by the generative AI engine, based on, for example, one or both of user data or menu/feature usage. The subset may be fewer than all of the menu items in the multiple levels of menus. This may provide the user with a streamlined menu that may be preferrable when not all menu items are needed by the user and an improved user experience with the user interface of the application.

A method for dynamically generating a user-customized single layer menu for a computer-implemented application may be provided in accordance with the present disclosure. The single layer menu may include a subset of user-selectable menu items that are available across multiple layers of a multi-layer menu provided for the computer-implemented application. The method may include receiving, using one or more processors, user-specific data and menu data from the computer-implemented application on a user device. The user-specific data may include a task or a topic on which a user is currently working using the computer-implemented application. The menu data may include a record of the menu items in the multiple layers that are provided by the computer-implemented application. The method may include detecting the task or the topic. The method may include generating, using the one or more processors, the single layer menu using a generative AI engine to select, based on the user-specific data and menu data, which of the menu items in the multiple layers to include in the single level menu. The method may include providing the single layer menu to the user to enable the user to interact with the computer-implemented application by selecting one or more menu items from the single layer menu.

A method for dynamically generating a user-customized single level menu for a computer-implemented application may be provided in accordance with the present disclosure. The single level menu may include a subset of user-selectable menu items that are available across multiple levels of a multi-level menu provided for the computer-implemented application. The method may include receiving, using one or more processors, user-specific data and menu data from the computer-implemented application on a user device. The user-specific data may include a task or a topic on which a user is currently working using the computer-implemented application. The menu data may include a record of the menu items in the multiple levels that are provided by the computer-implemented application. The method may include detecting the task or the topic. The method may include generating, using the one or more processors, the single level menu using a generative AI engine to select, based on the user-specific data and menu data, which of the menu items in the multiple levels to include in the single level menu. The method may include providing the single level menu to the user to enable the user to interact with the computer-implemented application by selecting one or more menu items from the single level menu.

The user selection of the one or more menu items from the single level menu may cause one of an execution of a deposit or a withdrawal at an ATM, an electronic trade, an online investment management or a loan-related transaction, an electronic deposit, a foreign currency exchange, or an online balance inquiry.

The method may include updating the single level menu, using the generative AI engine, to change which of the menu items are included in the single level menu upon detection of a change in the user-specific data or the menu data such that the customized single level menu that is generated is dynamically customized to the user.

The user-specific data further may include a history of previous selections of the menu items by the user.

The method may include generating of the single level menu comprises selecting menu items to be included in the single level menu based on the history of the previous selections of the menu items by the user. The history of previous selections of the menu items may include a history of the previous selections by the user when addressing the task or the topic.

The user-specific data further comprises a user profile of the user for whom the single level menu is generated. The menu data further comprises usage history of each of the menu items by one or more users other than the user.

The method may include enabling modification, by the user, of the single level menu to add or delete menu items from the single level menu.

The single level menu may include a maximum number of menu items, wherein the maximum number is specified by the user or a third party.

A system for dynamically generating a user-customized single level menu for a computer-implemented application may be provided in accordance with the present disclosure. The single level menu may include a subset of user-selectable menu items that are available across multiple levels of a multi-level menu provided for the computer-implemented application. The system may include an input for receiving one or more of user-specific data and menu data from the computer-implemented application on a user device. The user-specific data may include a task or a topic that a user is currently addressing using the computer-implemented application. The menu data may include a record of the menu items in the multiple levels that are provided by the computer-implemented application. The system may include a generative AI engine that is configured to generate the single level menu by selecting, based on the one or more of user-specific data and menu data, which of the menu items in the multiple levels to include in the single level menu. The system may include an interface that is configured to output to the user device the single level menu to enable the user to select one or more menu items from the single level menu.

The user selection of the one or more menu items from the single level menu may cause, for example, one of an execution of a deposit or a withdrawal at an ATM, an electronic trade, an online investment management or a loan-related transaction, an electronic deposit, a foreign currency exchange, or an online balance inquiry.

The generative AI engine may be configured to update the single level menu, using the generative AI engine, to change which of the menu items are included in the single level menu upon detection of a change in the user-specific data or the menu data such that the customized single level menu that is generated is dynamically customized to the user. The user-specific data may include a history of previous selections of the menu items by the user.

The generative AI engine may be configured to generate the single level menu by selecting menu items to be included in the single level menu based on the history of the previous selections of the menu items by the user. The history of previous selections of the menu items may include a history of the previous selections by the user.

The user-specific data may include a user profile of the user for whom the single level menu is generated. The menu data may include usage history of each of the menu items by one or more users other than the user.

The single level menu generated using the generative AI engine may be configured to be modifiable by the user to add or delete menu items from the single level menu.

The single level menu may include a maximum number of menu items, wherein the maximum number is specified by the user or a third party.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 10 shows an illustrative example of a flow chart of a method for dynamically generating a single level menu using generative AI in accordance with principles of the disclosure.

DETAILED DESCRIPTION OF THE DISCLOSURE

Figure 1:
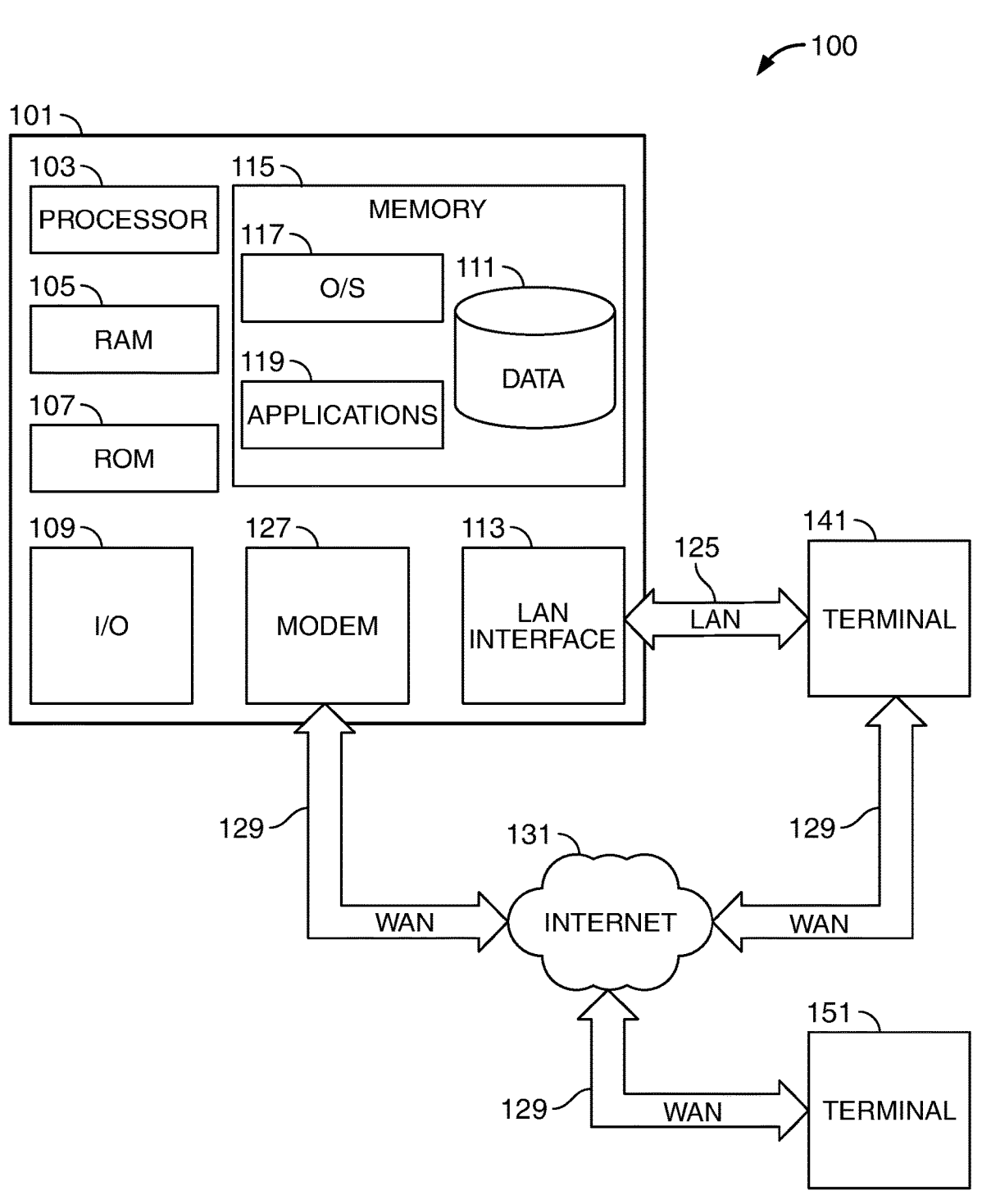
FIG. 1 shows an illustrative system architecture in accordance with principles of the disclosure.

The present disclosure relates to systems and methods that may generate, using a generative AI engine, a single level menu for a user interface that is customized to a user for a computer-implemented application to use during a user session. Where there are multiple users, each user may receive a personalized single level menu that is customized to the user and may include menu items that the user is more likely to need during that user session.

The customized single level menu may include only a subset of menu items from across one or more of multiple levels of a multi-level menu. The subset may include the menu items that a generative AI engine determines that the user will need for one or more tasks or a topic on which the user is working. The subset may include fewer than all menu items available in the multi-level menu. The single level menu may allow the user to select one or more menu items without drilling down to a lower level menu. The single level menu may be configured to be used during a particular user session or for multiple user sessions. The single level menu may be retained for use after one user session so that the single level menu may be used again during a future user session.

The single level menu may be generated dynamically so that the menu items included in the single level menu may be updated. The update may be continuous based on changes in the user-specific data or menu data. The update may be periodic.

An initial single level menu may be generated by the generative AI engine based on input that the generative AI engine receives about the user. The single level menu may be generated using menu items selected from multiple levels of a multi-level menu. The generative AI engine may use an AI/ML algorithm. Inputs to the generative AI engine may include user-specific data about a task or topic on which the user is working. Inputs to the generative AI engine may include the user's profile, such as a user's role in a company, search history of the user, or search history of other users who have similar profiles as the current user. The generative AI engine may customize the single level menu to the specific user based on the user's usage of the application, such as on the user's usage of available menu items. In determining which menu items to include within the single level menu, the generative AI engine may more heavily weight recent selections of menu items by the user than older selections of menu items.

After an initial customized single level menu is generated, the single level menu may be changed dynamically so that the customized single level menu may be subject to change based on changes detected in user information. The generative AI engine may generate a single level menu that may be updated, such as when a change is detected in a topic or task on which the user is working. The generative AI engine may generate a single level menu or an update to the single level menu based on a user history of selecting certain menu items or search terms used by the user to find menu items, preferred search topics performed by the user, or user profile information. The changes to the single level menu may be made as changes in the user information that is compiled changes. The changes to the single level menu may be made from time to time, such as at a predetermined interval. The changes to the single level menu may be made based on instructions from the user specifying how frequently to update the single level menu. The changes to the customized single level menu may be made by the generative AI engine also based on past single level menus that have been generated for the user. In embodiments, the customized single level menu may change dynamically by generating a new customized single level menu.

Illustrative embodiments of methods, systems, and apparatus in accordance with the principles of the invention will now be described with reference to the accompanying drawings, which form a part hereof. It is to be understood that other embodiments may be used, and structural, functional, and procedural modifications may be made without departing from the scope and spirit of the present invention.

The drawings show illustrative features of methods, systems, and apparatus in accordance with the principles of the invention. The features are illustrated in the context of selected embodiments. It will be understood that features shown in connection with one of the embodiments may be practiced in accordance with the principles of the invention along with features shown in connection with another of the embodiments.

The methods, apparatus, computer program products, and systems described herein are illustrative and may involve some or all the steps of the illustrative methods and/or some or all of the features of the illustrative system or apparatus. The steps of the methods may be performed in an order other than the order shown or described herein. Some embodiments may omit steps shown or described in connection with the illustrative methods. Some embodiments may include steps that are not shown or described in connection with the illustrative methods, but rather are shown or described in a different portion of the specification.

FIG. 1 shows an illustrative block diagram of system 100 that includes computer 101. Computer 101 may alternatively be referred to herein as an "engine," "server" or a "computing device." Computer 101 may be any computing device described herein, such as the computing devices running on a computer, smart phones, smart cars, smart cards, and any other mobile device described herein. Elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

Memory 115 may be comprised of any suitable permanent storage technology—e.g., a hard drive. Memory 115 may store software including the operating system 117 and application(s) 119 along with any data 111 needed for the operation of computer 101. Memory 115 may also store videos, text, and/or audio assistance files. The data stored in Memory 115 may also be stored in cache memory, or any other suitable memory.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all the elements described above relative to computer 101.

In some embodiments, computer 101 and/or Terminals 141 and 151 may be any of mobile devices that may be in electronic communication with consumer device 106 via LAN, WAN, or any other suitable short-range communication when a network connection may not be established.

When used in a LAN networking environment, computer 101 is connected to LAN 125 through a LAN interface 113 or an adapter. When used in a WAN networking environment, computer 101 may include a communications device, such as modem 127 or other means, for establishing communications over WAN 129, such as Internet 131.

In some embodiments, computer 101 may be connected to one or more other systems via a short-range communication network (not shown). In these embodiments, computer 101 may communicate with one or more other terminals 141 and 151, such as the mobile devices described herein etc., using a personal area network (PAN) such as Bluetooth®, NFC (Near Field Communication), ZigBee, or any other suitable personal area network.

It will be appreciated that the network connections shown are illustrative and other means of establishing a communications link between computers may be used. The existence of various well-known protocols such as TCP/IP, Ethernet, NFT, HTTP, and the like is presumed, and the system can be operated in a client-server configuration to permit retrieval of data from a web-based server or API (Application Programming Interface). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may use one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may use the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smartphones, multiprocessor systems, microprocessor-based systems, cloud-based systems, programmable consumer electronics, network PCs, minicomputers, mainframe computers, distributed computing environments that include any of the above systems or devices, and the like.

Figure 2:
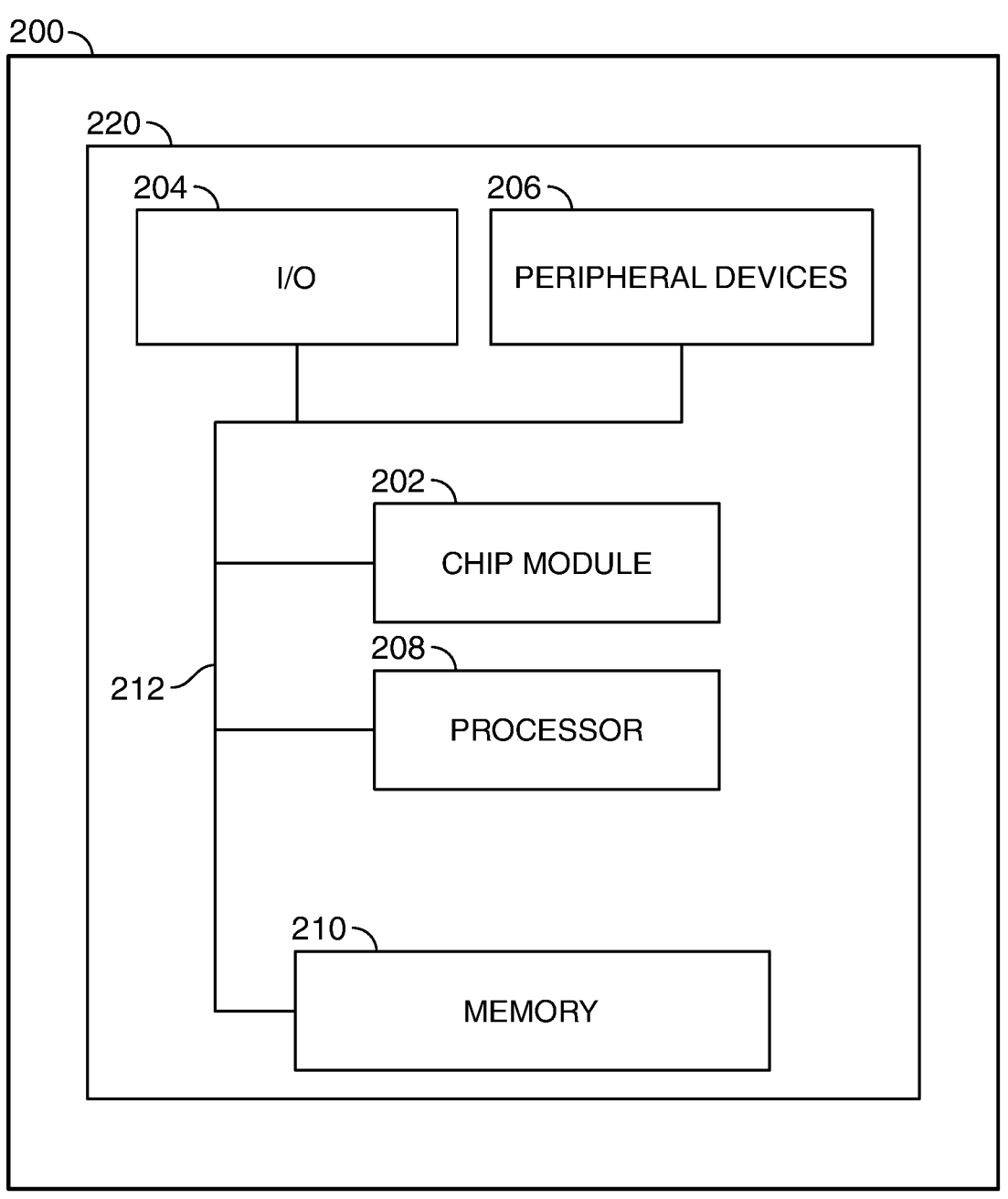
FIG. 2 shows an illustrative apparatus of a device in accordance with principles of the disclosure.

FIG. 2 shows illustrative apparatus 200, which may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY level hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
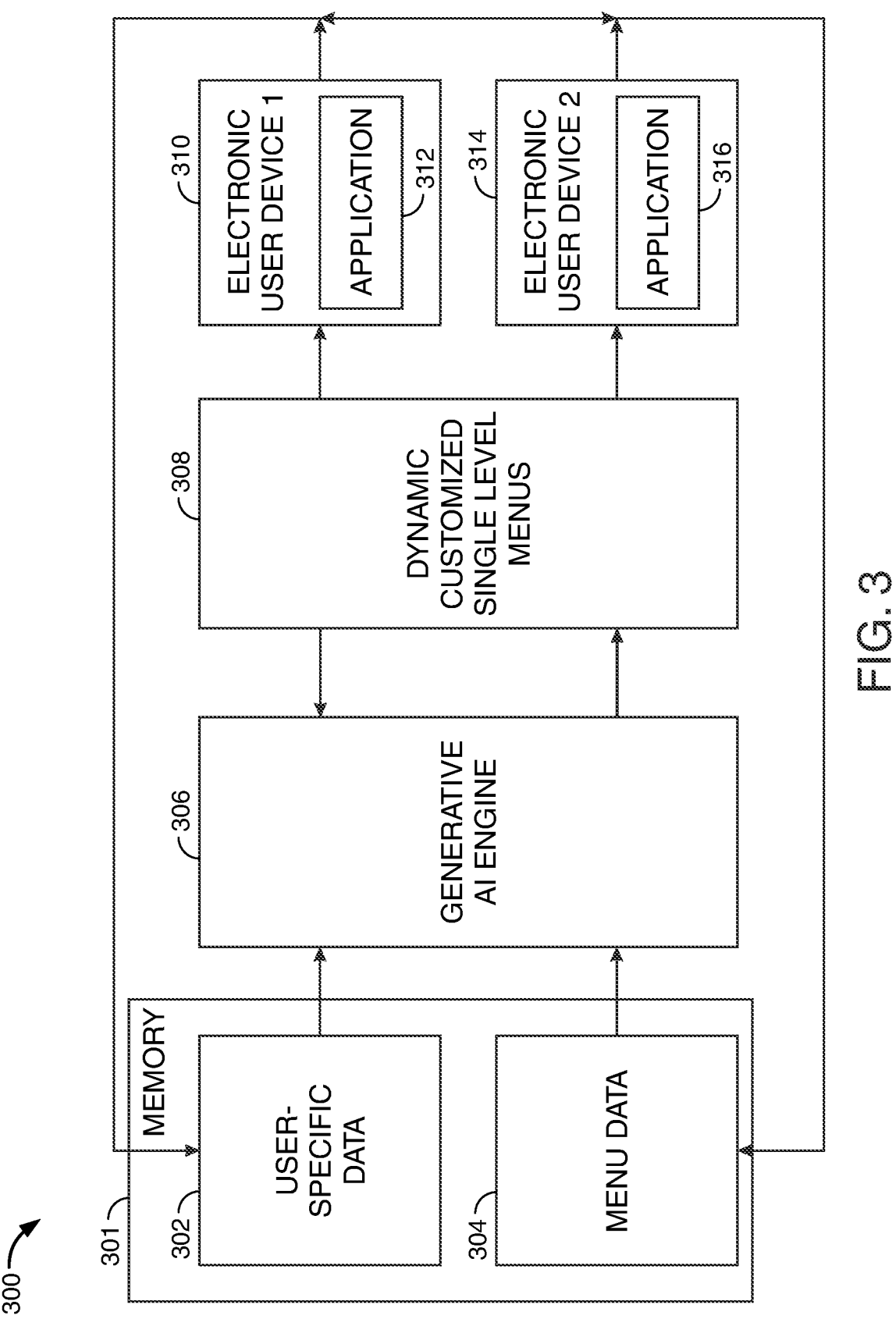
FIG. 3 shows an illustrative system architecture in accordance with principles of the disclosure.

FIG. 3 shows an illustrative system architecture in accordance with principles of the disclosure. A user may use user device 310 to access an application 312 loaded on user device 310 or accessible on user device, such as via a cloud. User device may be a computing device. Application 312 may provide a multi-level menu from which a user may select a menu item (option) to execute a command in application 312. The multi-level menu may be cumbersome to navigate, especially if there are many menu and submenu options. While certain applications may allow a user to search a multi-level menu for one or more menu items desired by the user, that option may not be especially convenient.

System 300 may streamline a multi-level menu from multiple levels by providing a generative AI engine 306 to automatically generate a single level menu. Generative AI engine 306 may be located on premises with the user device or may be located remotely from the user device. The single level menu may be customized to a user's actual or anticipated usage of application 312 and may change dynamically, such as based on changes in the user's usage of application 312.

As shown in FIG. 3, system 300 may include a memory 301 at which user-specific data 302 and menu data 304 may be compiled and stored. User-specific data 302 and menu data 304 may be obtained from user device 310. User-specific data may include a task or topic on which on which the user is working using application 312. The task or topic may be detected by user device 310, such as by monitoring the words used by the user, or a usage history of the menu items of application 312 by the user. The user-specific data may include, for example, one or more of a user profile of the user for whom the single level menu is generated, the usage history of the menu items by the user of the application, or other user-related data that may be collected by user device 310. Menu data may include a record of the menu items that are provided by the computer-implemented application. The menu data may include usage history of each of the menu items by different users other than the user. The computer-implemented application may be implemented as an application in software, hardware, or a combination of software and hardware. The application may be resident on the user device or on a cloud and accessible to the user device.

The user-specific data information and menu data, which may include a list of menu items that are included in a multi-level menu of a computer-implemented application on a user device may be input to generative AI engine 306. Generative AI engine 306 may include an algorithm to generate a single level menu that is configured to be used with application 312. The single level menu may be customized to the user based on the user-specific data and menu data. The customized single level menu may be output to a memory 308 and may be stored for use by generative AI engine 306 as a starting point for dynamically changing the single level menu for the user. Storing a single level menu that is generated may also enable a user to choose the same single level menu option for use at a later time, even after the single level menu has been dynamically changed by generative AI engine 306.

The single level menu may be stored with one or more other single level menus for the same user for future use by the generative AI engine 306 to use as a starting point for generating a new single level menu, or may be accessed by a user using an electronic application for future use by the user if where the user prefers a previously generated single level menu.

Generative AI engine 306 may be trained on a generative AI model. The training set for the model may include data from prior user usage of application 312 or another application, and may include data from other similarly situated users who used fewer than all, i.e., only a subset, of menu items from encountered multiple level menus. Similarly situated users may be users with similar user profiles, such as for co-workers in a similar line of business or working on similar types of documents or projects, if detectable. A generative AI menu algorithm may be used by generative AI engine 306 to generate the single level menu. The single level menu may include instructions for the display of the single level menu, such as, for example, one or more of the display of the single level menu, placement of the single level menu and menu items on a display, or for a range or a maximum number of items to be included in the single level menu.

The menu items that are selected to be included by the generative AI engine may also be based on a user profile information or other user information that may be entered by a user or captured from other sources.

The generated single level menu may then be forwarded to user device 310 to be available for use by the user with application 312. The user may be offered an option to decide to enable the single level menu to be displayed for user interaction with the single level menu, or the user may decide to disable the single level menu. The user may also have an option of manually modifying the single level menu to change the menu items in the single level menu. The user may be given an option of determining how frequently to update the single level menu.

Generative AI engine 306 may also be used to generate dynamic customized single level menus for other users using applications at the same or other user devices. For example, user device 314 may include an application 316 that includes a multi-level menu. Generative AI engine 306 may be used to generate a customized single level menu for application 316.

A user using user device 310 may attempt to access a cloud-based application to perform a transaction. The application may be, for example, a financial service application, such as for banking, trading, or investments. Where the application is for financial services, user selection of the one or more menu items from the single level menu may cause one of an execution of a deposit or a withdrawal at an ATM, an electronic trade, an online investment management or a loan-related transaction, an electronic deposit, a foreign currency exchange, or an online balance inquiry, based on which menu item the user has selected. The application may be an application other than for financial services, such as, for example, a software application for word processing, a spreadsheet, or a drawing program.

A multi-level menu may be displayed on a device in different ways. In embodiments, a menu may be configured for a user to drill down from one menu screen to a next menu screen. A first main menu may be displayed, a submenu may be displayed upon user selection of a menu item in the main menu and may overlay or replace the displayed main menu. A sub-sub menu may be displayed upon user selection of a menu item in the sub-menu. Each of the main menu, sub-menu, and the sub-sub-menu may be considered a different level of a multi-level menu. In other embodiments, the main menu may remain displayed while the sub-menu is displayed separately (e.g., adjacent) or partially overlaid on the main menu, and a sub-sub menu may be displayed separately or partially overlaid onto the main menu or the sub-menu. A menu level may be a menu layer, i.e., a layer within a menu.

FIGS. 4 to 7 illustrate some menus and sub-menus that may be available within a computer-implemented application which a user may be accessing on a user device.

Figure 4:
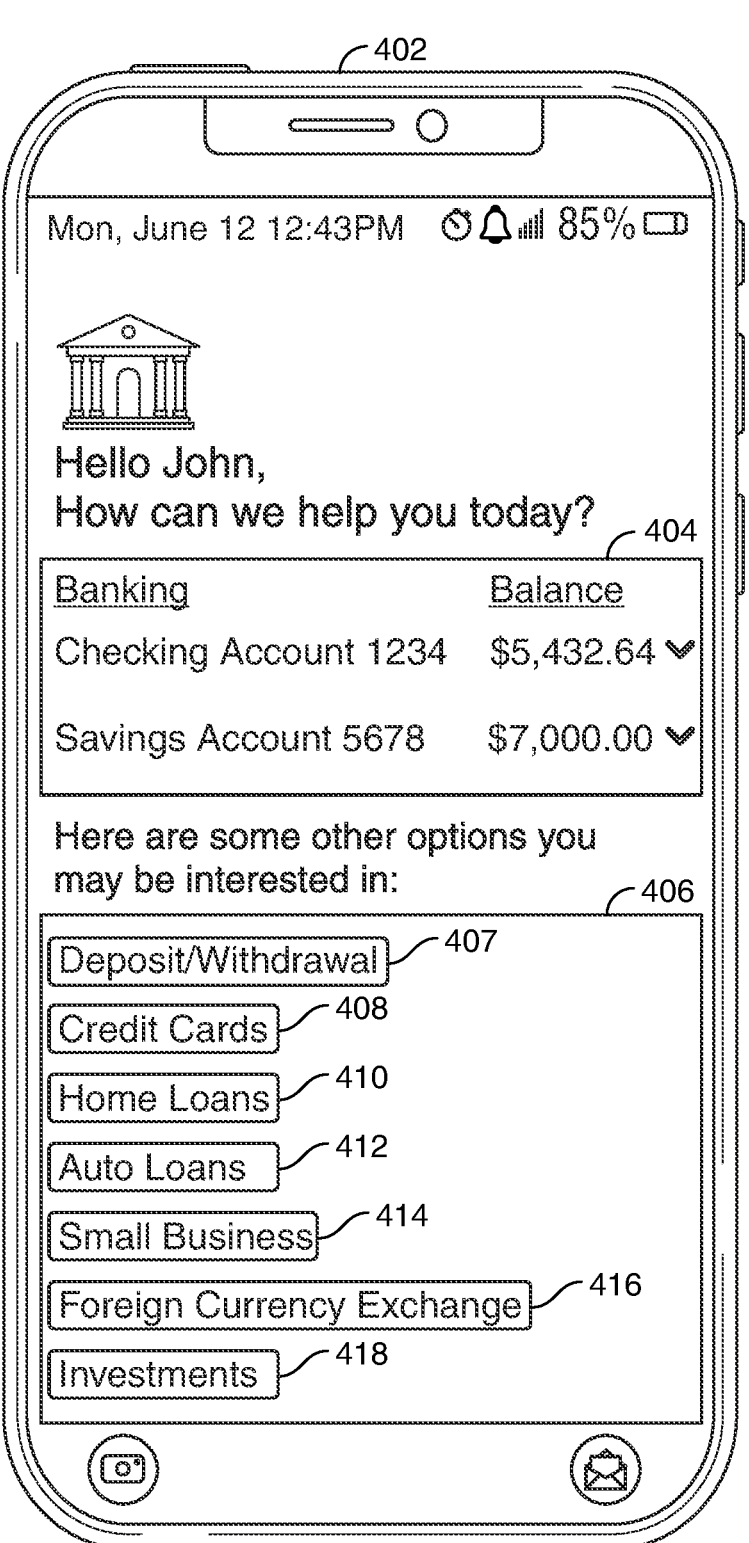
FIG. 4 shows an illustrative main menu screen for a software application in accordance with principles of the disclosure.

FIG. 4 shows an illustrative example of a main menu 402 of a multi-level menu in which a user may drill down from one level to the next. The menus may be displayed on a mobile device. Multiple menu items may be displayed on the main menu, including a banking option 404, and other menu items, including deposit/withdrawal 407, credit cards 408, home loans 410, auto loans 412, small business 414, foreign currency exchange 416, and investments 418. One or more of the menu items may be selected from the main menu.

Figures 5, 6, 7:
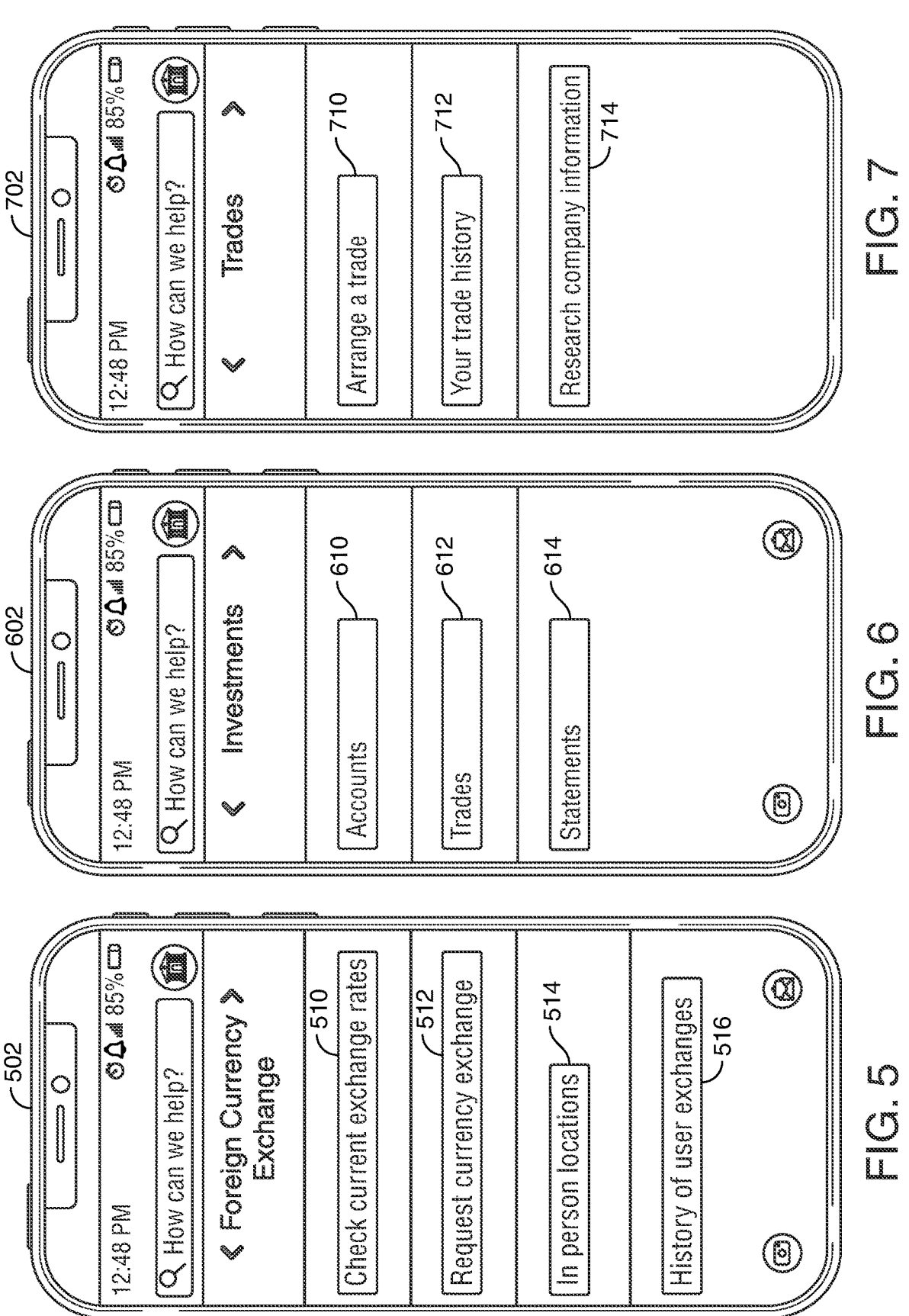
FIG. 5 shows an illustrative second level menu screen that may be available for use with the application and may include a first submenu of the main menu of FIG. 4 in accordance with principles of the disclosure.
FIG. 6 shows an illustrative second level menu screen that may be available for use with the application and may include a second, different submenu of the main menu of FIG. 4 in accordance with principles of the disclosure.
FIG. 7 shows an illustrative third level menu screen that may include another submenu of the submenu of FIG. 6 that may be available for use with the application in accordance with principles of the disclosure.

FIG. 5 shows an illustrative example of a sub-menu 502 for foreign currency exchange that may be selected as menu item 416 from main menu 402. Sub-menu 502 may include one set of menu items. For example, sub-menu 502 may include menu items check current exchange rates 510, request a currency exchange 512, locations for the user to make an in-person foreign currency exchange 514, and a history of the user's past foreign currency exchanges 516.

FIG. 6 shows an illustrative example of another sub-menu 602 for investments that may be selected ad menu item 418 from main menu 402. Sub-menu 602 may include other menu items, such as user accounts 610, a trading menu item 612, and a statements menu item 612 to select past investment statements.

FIG. 7 shows an illustrative example of a sub-sub-menu 702 of menu item 612 on sub-menu 602 for trading. Menu items in sub-sub-menu 702 may include, for example, arrange a trade 710, user trade history 712, and research company information 714.

The menu items available in the multi-level menu for the computer-implemented application may be provided to generative AI engine 306. The user's current or past usage of the application may also be provided to generative AI engine 306. This usage may relate to a task or a topic on which the user is working using the application. For example, generative AI engine may detect that a user is interested in executing a trade based on selections that the user has made and based on a generative AI model at generative AI engine 306. Rather than have the user navigate through the different menus that the user might need to check to perform the trade, generative AI engine may generate a single level menu that includes menu items that may be pertinent to provide a simplified menu to the user.

The generative AI engine may also receive usage history of each of the menu items by one or more users other than the user in which case the generative AI algorithm may also generate the customized single level menu based on menu items selected by other users for the same or a similar application.

Figure 8:
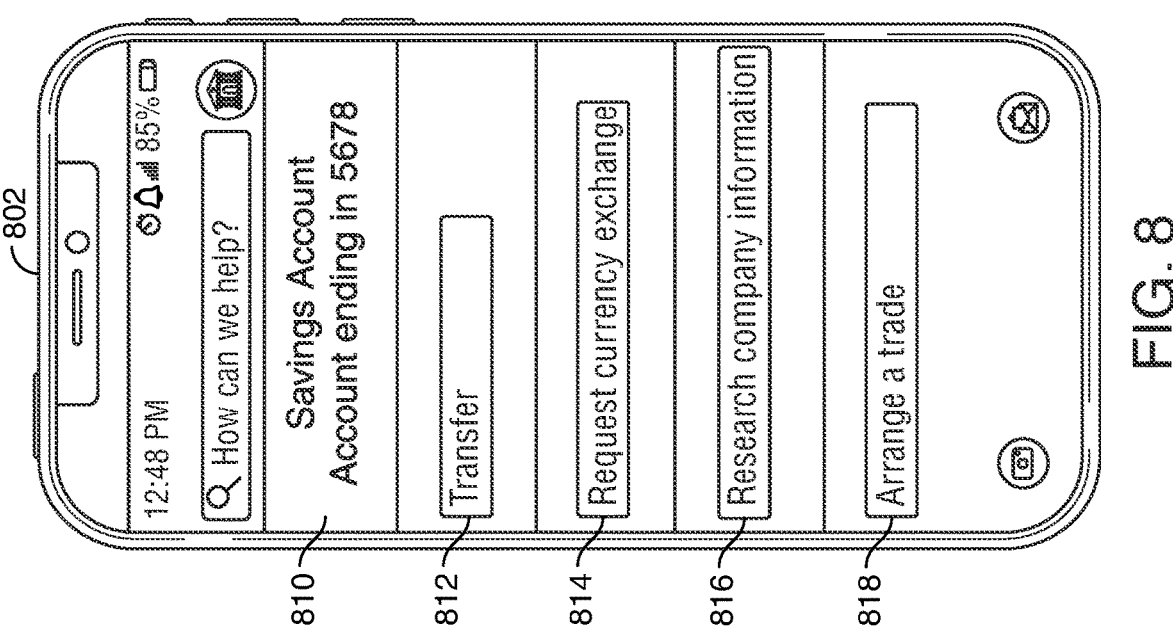
FIG. 8 shows an illustrative single level menu that may be dynamically customized based on a multi-level menu and generated using generative AI in accordance with principles of the disclosure.

FIG. 8 shows an illustrative example of a customized single level menu 802 that may be generated by a generative AI engine based on multiple levels of a multi-level menus in FIGS. 4 to 7. The single level menu 802 may include menu items from different levels of the multi-level menu in FIGS. 4 to 7. In the example of FIG. 8, the generative AI engine may detect that a user using a user device is considering making a stock trade in a foreign currency using cash. The single level menu may include menu items that simplify the user's task. The menu item that are included in the single level menu 802 may include a menu option 812 to transfer funds from a user's savings account 810 to make funds available for the trade, a menu option 814 to request a currency exchange, a menu option 816 to research company information about companies in which the user is interested, and a menu option 818 to arrange the trade. Transfer option 812 may be a menu item from main menu 402, request currency exchange 814 may be a menu item from sub-menu 502, and research company information and arrange a trade may be menu items in sub-sub-menu 702.

The single level menu may be updated to change which of the menu items are included in a generative-AI generated single level menu upon detection of a change in the user-specific data or the menu data. The update may be continuous. The update may be periodic. The update may be user specified. By updating the single level menu, the customized single level menu that is generated may be dynamically customized to the user. For example, a change may be detected where the user opens a copy of a credit card after the initial single level menu is generated. As another example, a detection may be based on terms that a user may use in performing a search with a web browser.

Figure 9:
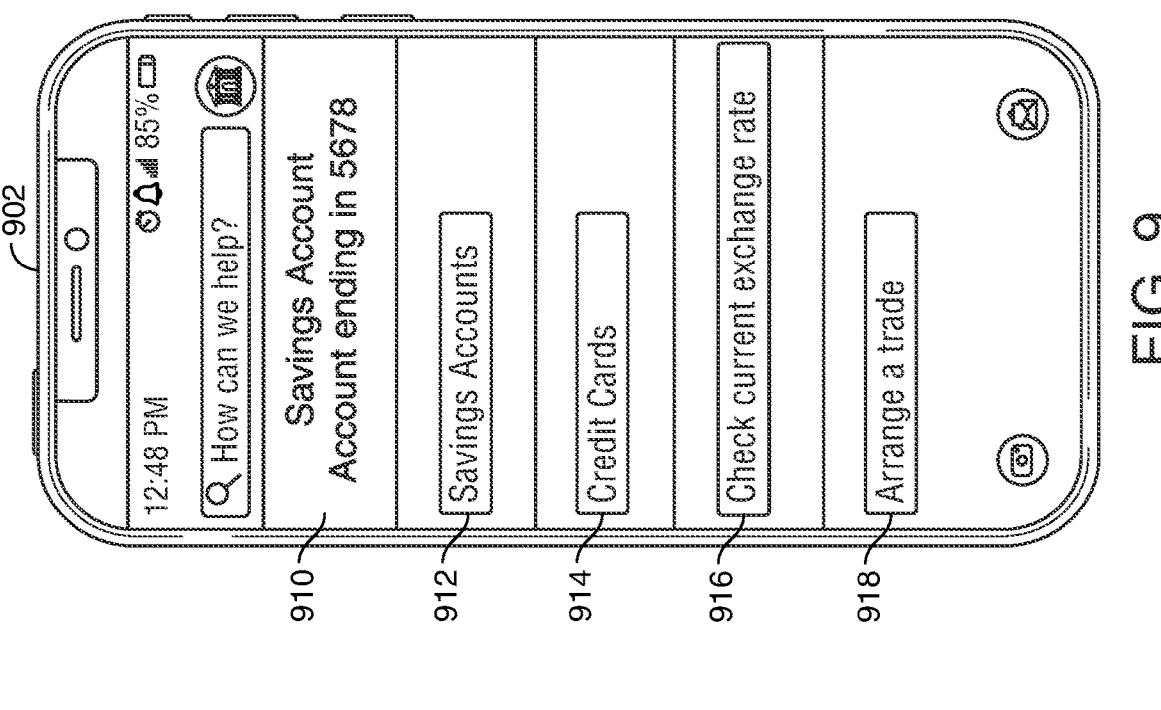
FIG. 9 shows another illustrative single level menu that has been dynamically customized based on a multi-level menu and generated using generative AI in accordance with principles of the disclosure.

FIG. 9 shows an illustrative example of another single level menu 902 that may be generated by a generative AI engine based on multiple levels of a multi-level menus in FIGS. 4 to 7. Single level menu 902 may be a single level menu that has been dynamically changed from single level menu 802 based upon detecting that a user wishes to pay a credit card bill that must be paid in foreign currency. The investigating conducting the stock trade to pay a credit card bill. Menu 902 may include menu options, such as a menu option 912 (from menu 402) to make a balance inquiry for the user's saving account 910, a menu option 914 (from menu 402) to select a credit card to be paid, a check currency exchange rate (from menu 502) where the credit card bill must be paid in a foreign currency. Menu 902 may include an option to arrange a trade (from menu 702).

The single level menu for an application may be generated at a single user device, such as electronic user device 310, or may also be provided to another device of the user, such as user device 314.

The generative AI engine may be programmed to only generate a limited number of menu items in the customized single level menu. The limited number may be a subset of the total number of menu items in the levels of the multi-level menu from which the single level menu is generated. The generative AI engine may be programmed to generate a single level menu with a minimum number of menu items, a maximum number of menu items, or a range of menu items that may be included in the single level menu. For example, the main menu may be limited to a maximum of up to 5, 10, or 20 menu items while the total number of menu items in a multi-level menu may include, for example, a total of 30 menu items. The user or a third party may also be able to input a parameter to the generative AI engine that specifies the maximum number of menu items. This may prevent the screen on a user device from becoming cluttered with menu items, including menu items which the user does not need for the task or topic on which the user is working.

Moreover, the generative AI engine may be programmed to always include certain menu items. Another input may allow the user to specify certain menu items to always be included in the single level menu. The user may further customize the single level menu to add or remove individual menu items from the single level menu. The user may be further enabled to toggle on or off the dynamic customized single level menu option if the user prefers the multi-level menu provided with the application.

FIG. 10 shows an illustrative example of a flow chart 1000 for performing a method for dynamically generating a user-customized single level menu that includes a subset of menu items from one or more level of a multi-level menu using a generative AI engine.

At step 1010, the generative AI engine may receive user-specific data and menu data for a computer-implemented application. At step 1020, the generative AI engine may use generative AI to generate a user-customized single level menu that includes a subset of menu items selected from a multi-level menu. The selected subset may be based on the user-specific data and the menu data. At step 1030, the single level menu may be output and provided to a user device to enable user interaction with the single level menu to select a menu item from the single level menu.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for generating a single level menu based on a multi-level menu using generative AI may be provided. Persons skilled in the art will appreciate that the present invention can be practiced by other than the described embodiments, which are presented for purposes of illustration rather than of limitation.

What is claimed is:

1. A method for dynamically generating a user-customized single level menu for a computer-implemented application that includes a subset of user-selectable menu items that are available in the computer-implemented application across multiple levels of a multi-level menu provided for the computer-implemented application, the method comprising:

receiving user-specific data and menu data from the computer-implemented application on a user device;

wherein:

the user-specific data comprises a task or a topic on which a user is currently working using the computer-implemented application; and the menu data comprises a record of the menu items in the multiple levels that are provided by the computer-implemented application;

generating the single level menu using a generative AI engine to select, based on the user-specific data and menu data, which of the menu items from two or more different levels in the multiple levels to include in the single level menu; and providing the single level menu to the user to enable the user to interact with the computer-implemented application by selecting one or more menu items from the single level menu.

2. The method of claim 1, wherein user selection of the one or more menu items from the single level menu causes one of an execution of a deposit or a withdrawal at an ATM, an electronic trade, an online investment management or a loan-related transaction, an electronic deposit, a foreign currency exchange, or an online balance inquiry.

3. The method of claim 1, further comprising updating the single level menu, using the generative AI engine, to change which of the menu items are included in the single level menu upon detection of a change in the user-specific data or the menu data such that the single level menu that is generated is dynamically customized to the user.

4. The method of claim 1 wherein the user-specific data further comprises a history of previous selections of the menu items by the user.

5. The method of claim 4, wherein the generating of the single level menu comprises selecting menu items to be included in the single level menu based on the history of the previous selections of the menu items by the user.

6. The method of claim 4, wherein:

the history of previous selections of the menu items comprises a history of the previous selections by the user when addressing the task or the topic.

7. The method of claim 1, wherein the user-specific data further comprises a user profile of the user for whom the single level menu is generated.

8. The method of claim 1, wherein the menu data further comprises usage history of each of the menu items by one or more users other than the user.

9. The method of claim 1, further comprising:

enabling modification, by the user, of the single level menu to add or delete menu items from the single level menu.

10. The method of claim 1, wherein the single level menu comprises a maximum number of menu items, wherein the maximum number is specified by the user or a third party.

11. A system for dynamically generating a user-customized single level menu for a computer-implemented application that includes a subset of user-selectable menu items that are available in the computer-implemented application across multiple levels of a multi-level menu provided for the computer-implemented application, the system comprising:

an input for receiving one or more of user-specific data and menu data from the computer-implemented application on a user device;

wherein:

the user-specific data comprises a task or a topic that the user is currently working on using the computer-implemented application; and the menu data comprises a record of the menu items in the multiple levels that are provided by the computer-implemented application;

a generative AI engine that is configured to generate the single level menu by selecting, based on the one or more of user-specific data and menu data, which of the menu items from two or more different levels in the multiple levels to include in the single level menu; and an interface that is configured to output to the user device the single level menu to enable a user to select one or more menu items from the single level menu.

12. The system of claim 11, wherein user selection of the one or more menu items from the single level menu causes one of an execution of a deposit or a withdrawal at an ATM, an electronic trade, an online investment management or a loan-related transaction, an electronic deposit, a foreign currency exchange, or an online balance inquiry.

13. The system of claim 11, wherein the generative AI engine is further configured to update the single level menu, using the generative AI engine, to change which of the menu items are included in the single level menu upon detection of a change in the user-specific data or the menu data such that the single level menu that is generated is dynamically customized to the user.

14. The system of claim 11 wherein the user-specific data further comprises a history of previous selections of the menu items by the user.

15. The system of claim 14, wherein the generative AI engine is further configured to generate the single level menu by selecting menu items to be included in the single level menu based on the history of the previous selections of the menu items by the user.

16. The system of claim 14, wherein:

the history of previous selections of the menu items comprises a history of the previous selections by the user.

17. The system of claim 11, wherein the user-specific data further comprises a user profile of the user for whom the single level menu is generated.

18. The system of claim 11, wherein the menu data further comprises usage history of each of the menu items by one or more users other than the user.

19. The system of claim 11, wherein the single level menu generated using the generative AI engine is configured to be modifiable by the user to add or delete menu items from the single level menu.

* * * * *